UNITED STATES PATENT OFFICE.

JOHN F. NORMAN, OF LIMA, OHIO.

COMPOSITION OF MATTER.

943,157.  Specification of Letters Patent.  Patented Dec. 14, 1909.

Application filed February 8, 1909. Serial No. 476,837.

*To all whom it may concern:*

Be it known that I, JOHN F. NORMAN, a citizen of the United States, residing at Lima, in the county of Allen and State of Ohio, have invented new and useful Improvements in a Composition of Matter, of which the following is a specification.

My present invention relates to improvements in compositions of matter or substitute material, and more especially to that class of substance that are used for friction purposes, such for instance as composition fillings for brake-shoes, and it has for its object primarily to provide an improved artificial material of this character that possesses a high co-efficient of friction, and is capable of resisting the heating tendency thereof due to the friction generated between the material and a wheel or other object with which it coöperates.

Another object of the invention is to provide an improved artificial material of this general class which is capable of resisting wear to a considerable degree so as to lengthen the life of the material when used for the purpose of a fricticon facing, and a further object of the invention is to provide such a composition that may be readily and cheaply manufactured of ingredients that are easily procurable, and to provide certain improvements over Letters-Patent No. 818,833, granted to Jacob Laeufer, April 24, 1906, the compositions specified in the present instances adapting the material especially for use as a friction material or filling for composition brake-shoes and analogous devices. The composition in its elemental form consists essentially of a body composed preferably of bone, such for instance as bone, which may be divided by grinding or otherwise so as to secure a degree of fineness appropriate to the desired characteristics of the resulting composition, and this constituent of the composition is hardened and solidified by an indurating and binding agent, preferably Portland cement. A heat-resisting agent is also incorporated in the composition which adapts it especially for use as a friction material, it being preferable to employ a heat resisting agent or medium, such for instance, as asbestos, the smoother qualities of the asbestos counteracting in a measure any tendency to cut the surface with which it coöperates.

An effective binding of the above elements is attained by the incorporation of an appropriate quantity of blood prepared preferably in the manner set forth in the Letters-Patent above referred to, hereinafter described, to produce a composition in accordance with my present invention possessing a considerable degree of hardness, and wear resisting qualities. I propose to incorporate the ingredients in the proportion of say one pound of bone one pound asbestos, the latter being preferably in a condition to retain its fibrous formation, and to these ingredients is added two pounds of cement, and these three ingredients are moistened and reduced to a plastic consistency by the addition of a suitable quantity of blood prepared in the manner above set forth, two pounds of blood to each pound of bone being usually sufficient.

The mass in the plastic state is thoroughly stirred to secure an even mixing and uniform distribution of the constituents throughout the mass, and the mass is allowed to harden in a suitable mold whereby it may possess a shape appropriate to its intended uses. In preparing the composition for use as a friction facing for composition brake-shoes, it is preferable to press the mass in a plastic condition into the shell of the shoe wherein it is allowed to harden and thus lock itself in place.

The use of bloods of various kinds is appropriate, insuring a thorough cohesion of the solids composing the composition.

It will be understood of course that a composition made in accordance with my present invention is adapted for many different uses, and while it is in a plastic condition it may be molded in any shape suitable for its intended uses, but the composition given as an example in the present embodiment of the invention possesses distinct advantages as a friction material of the character used in connection with composition brake-shoes, the bone coöperating with the binding material to effect a thorough solidification of the mass so as to prevent fracture or disintegration thereof, the fibrous structure of the asbestos giving the material a considerable degree of toughness, and is particularly useful for the purpose of resisting heat generated by the friction between the material and the wheel tire or other friction surface with which it coöperates, and the asbestos also renders the composition fire-proof and gives the material a certain degree of softness or a yielding quality combined with an increased degree of toughness so that the composition when used on brake-shoes is capable of conforming to the contour of the wheel tire under considerable pressure without liability of breakage, and the softer quality of the material insures the proper degree of friction without liability of injuring or unduly wearing the tire of the wheel.

I claim as my invention:

1. A composition of the class described consisting of bone, a heat resisting agent, cement and blood thoroughly incorporated in or about the proportions mentioned.

2. A composition of the class described consisting of finely divided bone, cement, and blood prepared by incorporating one with the other in or about the proportions mentioned.

3. A composition of the class described consisting of a mixture of bone incorporated with, a heat resisting agent, cement and blood in or about the proportions mentioned.

4. A composition of matter consisting of a mixture of bone, asbestos, cement and blood, embodying as ingredients a fibrous material, a heat resisting material, cement, and blood mixed and solidified in or about the proportions mentioned.

5. A composition of the class described consisting of a bone base, asbestos, cement and water in or about the proportions mentioned.

6. A composition of the class described consisting of bone, blood, cement and water in or about the proportions mentioned.

7. A composition of the class described consisting of bone, blood, asbestos and cement in or about the proportions mentioned.

8. A friction material embodying a bone base, blood, and a deodorizer incorporated therewith in or about the proportions mentioned.

In testimony whereof I have hereto set my hand in presence of two subscribing witnesses.

JOHN F. NORMAN.

Witnesses:
JAMES S. GRAY,
B. F. WHITING.